(12) United States Patent
Robinson et al.

(10) Patent No.: US 8,812,506 B2
(45) Date of Patent: Aug. 19, 2014

(54) SYSTEM AND METHOD FOR CONDUCTING PROCESSOR-ASSISTED INDEXING AND SEARCHING

(75) Inventors: Peter N. Robinson, Berlin (DE); Sebastian Bauer, Berlin (DE); Sebastian Koehler, Berlin (DE); Marcel H. Schulz, Saarbruecken (DE)

(73) Assignee: Max-Planck-Gesellschaft zur Foerderung der Wissenschaften e.V, Munich (DE)

( * ) Notice: Subject to any disclaimer, the term of this patent is extended or adjusted under 35 U.S.C. 154(b) by 16 days.

(21) Appl. No.: 13/156,330

(22) Filed: Jun. 8, 2011

(65) Prior Publication Data
US 2012/0296895 A1 Nov. 22, 2012

Related U.S. Application Data

(60) Provisional application No. 61/488,077, filed on May 19, 2011.

(51) Int. Cl.
*G06F 17/30* (2006.01)
(52) U.S. Cl.
CPC .... *G06F 17/30619* (2013.01); *G06F 17/30616* (2013.01); *G06F 17/30687* (2013.01)
USPC .......................................... 707/739; 707/736
(58) Field of Classification Search
USPC ................................................. 707/736–739
See application file for complete search history.

(56) References Cited

U.S. PATENT DOCUMENTS

| 6,285,999 | B1 | 9/2001 | Page |
| 2004/0247166 | A1 | 12/2004 | Giger et al. |
| 2009/0083203 | A1* | 3/2009 | Cho et al. ........................ 706/21 |
| 2009/0234878 | A1 | 9/2009 | Herz et al. |
| 2009/0254572 | A1 | 10/2009 | Redlich et al. |
| 2010/0169338 | A1 | 7/2010 | Kenedy et al. |
| 2011/0040766 | A1 | 2/2011 | Robinson |
| 2011/0082881 | A1 | 4/2011 | Chunilal |
| 2011/0112380 | A1* | 5/2011 | Robinson ..................... 600/300 |
| 2011/0257988 | A1* | 10/2011 | Denekamp et al. ............... 705/2 |
| 2011/0320454 | A1* | 12/2011 | Hill et al. ..................... 707/739 |

OTHER PUBLICATIONS

Bauer et al., 2010, "Going Bayesian: model-based gene set analysis of genome-scale data", Nucleic Acids Research, 1-10.
Robinson et al., 2008, "The Human Phenotype Ontology: A Tool for Annotating and Analyzing Human Hereditary Disease", The Amer. J. of Human Genetics 83:610-615.
PCT International Search Report and Written Opinion from PCT/US12/38639 mailed on Jul. 24, 2012.
Zheng et al., "An Ontology-based Bayesian Network Approach for Representing Uncertainty in Clinical Practice Guidelines", Nov. 12, 2007, vol. 327 of CEUR Workshop Proceedings.

* cited by examiner

*Primary Examiner* — Khanh Pham
(74) *Attorney, Agent, or Firm* — Kenyon & Kenyon LLP

(57) ABSTRACT

Systems and methods are provided for processor-assisted indexing and searching, in which categories or individual documents within a database are annotated to the terms of an ontology, searched and then prioritized by rank. Items of the domain of interest, as well as the ontologies that describe attributes of those items, are embedded into a Bayesian network. Search queries correspond to user activations of items. An error model mimics incomplete or falsely specific items. Search results correspond to a subset of the items to which the query items are semantically-related. A probabilistic inference is performed to obtain marginal probabilities of each search result to explain the presence of the queries. These probabilities can then be used for ranking the search results.

21 Claims, 10 Drawing Sheets

SYSTEM AND METHOD FOR CONDUCTING PROCESSOR-ASSISTED INDEXING AND SEARCHING

CROSS-REFERENCE TO RELATED APPLICATION

This application claims all benefits of and priority to, under 35 U.S.C. §119(e), U.S. Provisional Patent Application Ser. No. 61/488,077, filed on May 19, 2011, the disclosure and all contents of which are herein incorporated by reference in their entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND INFORMATION

Generally, ontology is a study which focuses on understanding how things in the world can be divided into categories and how these categories are related to each another. Thus, when applied to a computer science interpretation, "ontology" is used with a related meaning to describe a structured, automated representation of the knowledge within a certain domain. Such domains may be science, government, industry, and healthcare. Essentially, an ontology provides a classification of the entities within a domain. Each entity is said to make up a term of the ontology. And, an ontology must specify the semantic relationships between the entities. Accordingly, an ontology can be used to define a standard, controlled vocabulary for a given industry or body of knowledge. Ontologies are sometimes represented as directed graphs having a set of nodes (or vertices) and edges (or links) between the nodes. In directed graphs, the edges are one-way and go from one node to another. The nodes of the directed graph for an ontology correspond to the terms of the ontology. They are assigned to entities in the domain and the edges between the nodes represent semantic relationships.

There is a semantic relationship used called the subsumption relationship which encodes that the concept behind one term subsumes the concepts of another term, i.e., it encodes generalization-specification relations. The subsumption hierarchy of an ontology may be represented by a directed acyclic graph (DAG). A cycle in a directed graph is a path along a series of two or more edges that leads back to the initial node in the path. For subsumption hierarchy of ontologies, terms appearing closer to the root are more general than their descendant terms.

In other situations, ontologies may be used in artificial intelligence, the Semantic Web, biomedical research, etc. With ontologies, one may search semantically-related descendant terms, which can increase the number of documents found as compared to methods that merely take the search term as a text string. Further, ontologies can be used to classify and describe the items (entities) of a domain. For instance, an ontology may be used to classify European wines (See, e.g., FIG. 1).

Domain ontologies may be used to improve searches by linking the ontology terms that are semantically linked. For example, if a user is searching an online wine catalog for "white wine", the wine ontology can be used to return not only catalog items listed as "white wine", but also items listed as "Riesling", "Sauvignon Blanc", or "Grauer Burgunder".

Another ontology type is used describe the attributes (or characteristics) of the items in a domain. For example, an ontology that describes the attributes of wine including its color, smell, taste, acidity, and so on (See, e.g., FIG. 2) can be used to annotate various kinds of wine in a catalog. For example, a Riesling might be annotated with the terms white, dry, and lemon, and a Rioja might be annotated with the terms red, dry, and almond scent. In this example, annotations follow the direction of the edges in the graph, so that "Riesling" is said to directly annotate "white". Further, for example, a user of an online wine catalog can enter the characteristics preferred in wine, such as red, nutty, and medium dry. The Bayesian inference methods presented in embodiments herein in the present invention can thus be used to identify the catalog items (e.g., wines) that best match the user's query. Or, for example, clinical features may be used attributes of medical conditions (e.g., diseases). Physicians can enter the clinical features they have observed in their patients and use the inference algorithms to identify the best matches among a database of diseases that have been annotated with a set of clinical features.

When annotating items via terms of an attribute ontology, often the so-called annotation propagation rule is implied. This rule holds that if one item is annotated to a term, then it is also annotated to all terms connected to that term along specific relations. This rule is useful, e.g., for the terms connected by subsumption relationships, because it means that annotations are propagated along more general terms towards the roots of the subsumption hierarchy. In other words, besides asserted annotations (i.e., direct connections between nodes), annotations can exist between nodes that are not directly connected.

SUMMARY

The present invention provides techniques for indexing and searching in databases using ontologies, as well as modeling ontologies. Categories or individual documents within the database that are annotated to the terms of the ontology can be searched and prioritized using the technique described in this invention. The database can be constructed from information contained in any repository of documents such as books, articles, internal company documentation, or web pages. One or more domain-specific attribute ontologies can be used to annotate the categories or a subset of the documents in the repository. An exemplary method according to the present invention constructs a search database by embedding the items of the domain of interest, as well as the ontologies that describe attributes of the items, into a Bayesian network (e.g., as nodes in the network), in which the query is a result of the activation of the items. An error model is integrated to mimic incomplete or falsely specific terms. Given the query, probabilistic inference can then be used to obtain marginal probabilities of each item to explain the presence of the query. These probabilities can be used for assigning ranks for documents such as books in a repository, items in online auction websites, documents within a repository of a company, or web pages.

The present invention relates to a method for conducting searching in databases, archives, knowledge repositories, and websites that comprise items that have been annotated to terms of attribute ontologies. The items correspond to potential search results. In embodiments, the items include medical conditions (e.g., diseases) and the ontology describes medical findings (e.g., signs, symptoms, and other abnormalities). However, the invention can be applied to any kind of categorized item obtained, e.g., from catalogs, books, personal records, and other documents.

According to example embodiments of the present invention, a system and a method obtain items and generate a search database as a network of nodes in which a first layer contains nodes corresponding to the items. A second layer contains nodes corresponding to potential search queries. A third layer contains additional nodes corresponding to hidden states of the nodes in the second layer. The nodes of all three layers are connected in accordance with semantic relationships specified by the ontology. The status of nodes in the second layer may be updated in response to user input of search queries that match the potential search queries. The status of nodes in the third layer may affect the status of other nodes, e.g., via the annotation propagation rule discussed in the Background Information section above. As a result, the probabilistic distributions of nodes in the first layer may also change in response to the status of nodes in the second layer.

According to example embodiments of the present invention, a system and a method receive search queries (e.g., medical findings) as input from a user (e.g., a physician) and apply an algorithm that compares the findings for each item with the set of terms of the ontology that is annotated to the item. A list of items (e.g., diseases) is output as search results. The list items are ranked based on how closely the items match the queries. A degree of matching may be indicated by calculating marginal probability values for each of the items, after taking into account the probabilistic effects of the findings.

According to example embodiments of the present invention, a system and a method take into consideration the possibility that a search query is incorrect. For example, a medical finding may be observed even though a patient has a finding that is not associated with the disease (i.e., a red herring, an unrelated finding). This can be regarded as "noise", either because the patient has an additional disease or because the physician has made a mistake, and thus such findings are false-positive (FP). It is also possible to see false negative (FN) results, e.g., when a disease feature is not present in an individual patient or if the physician fails to observe the feature (when, in fact, the patient has the disease). In the context of a network of annotated nodes, FP and FN results may be accounted for by adding one or more pairs of supplementary parameter nodes to the network, whose realization rates respectively correspond to known or expected FP and FN rates. Similar to nodes of the second layer, the supplementary nodes affect the local probability distribution (LPD) of the nodes in the third layer (and thus the marginal probability of the nodes in the first layer). For example, the probabilistic effects of the supplementary nodes are taken into consideration when calculating the marginal probabilities.

According to example embodiments of the present invention, a search database is implemented as a Frequency-Aware Bayesian Network (FABN). The FABN is frequency-aware in the sense that the calculation of the marginal probabilities also takes into account information about the frequency of annotations (e.g., the frequency with which a particular term occurs in conjunction with the occurrence of a particular search result). For example, the frequency information may be used to apply different weights to symptoms that are present only in a certain proportion of all patients with some disease, say, that fever is found in only 30% of patients with the common cold. In other words, if a symptom X is more likely to occur in disease A than in disease B, then (all else being equal) a patient with symptom X is more likely to have disease A than disease B.

Example embodiments of the present invention provide a system and method for modeling a query from at least one ontology, comprising: a processor; and a memory storing instructions that when executed by the processor perform a method including associating at least one first node (e.g., a disease) in a first layer with at least one first node (e.g., defined symptom) in a second layer, providing at least one first node (e.g., an observed symptom) in a third layer, wherein, for example, the at least one first node in the third layer or query layer (e.g., an observed symptom) is compared with the at least one first node in the second layer or hidden layer (e.g., defined symptom) to determine which at least one node in the first layer (e.g., disease) is associated with the at least one defined symptom. In embodiments, the system and method include frequency information to model uncertainty of the presence of certain symptoms. In embodiments, the system and method include a definitive error model accounting for false-positives and false-negatives between the at least one first node in the second layer (e.g., defined annotation) and the at least one first node in the third layer (e.g., query layer). In embodiments, the system and method provide for a propagation of false-positives and false-negatives along the structure of the ontology. In embodiments, the system and method provide a probabilistic inference for a user-given set of query terms (third layer) to score items (second layer) according to their marginal probability, and provide a presentation of such probabilistic inference to an entity.

In embodiments, the system and method provide for display of result(s) relevant to query input as they are being entered into the model. In embodiments, such display of result(s) changes as needed as additional query inputs are made. In embodiments, the system and method provide for variables of the second layer or hidden layer to have more than two states, e.g., to represent the state of unknown. In embodiments, the system and method provide for an entity, e.g., a user and/or computer, can specify a false-positive and/or false-negative rate(s) for arbitrary terms and to exploit this information in the probabilistic inference. In embodiments, the system and method provide for a processing of websites and/or documents accessible via the World Wide Web, catalog(s), archive(s), collection(s), and/or librar(ies), in order to automatically create and/or update an ontology of Web categor(ies) and annotation(s) to the Web resource(s), in which frequencies are used to capture the relative relevance of a Web resource with respect to the annotations category or hidden layer. In embodiments, the system and method provide for using frequencies with which words and concepts are used in books or other documents in order to generate frequency data for the ontology terms or hidden layer input that will enable subsequent searches.

In embodiments, the system and method provide for manual creation of at least one ontology and annotations. In embodiments, the system and method provide for an improved search including, e.g., searches for similar friends via social networks, suggestion of messages for visualization in websites, uses frequency data gathered from user data concerning likes and/or dislikes to weigh annotations in an ontology. In embodiments, the system and method provide for an improved search including, e.g., searches for a customer product, suggestion concerning a customer product, such information being annotated in an ontology, e.g., an attribute ontology, and that frequency data regarding buying behavior, customer evaluation scores, customer viewing statistics, etc. are used as frequency information annotated to the terms of the ontology. In embodiments, the system and method provide for an improved search including, e.g., searches for matching partners for a dating agency where attributes of people are saved as an ontology and the likes and dislikes of persons as well as the success statistics of previous matching attempts are utilized as frequencies to improve the partner matching or prediction of matching likelihood. In embodiments, the system and method provide for an improved search regarding medical diagnostics where the frequency of clinical abnormalities for disease(s) is taken into account in the differential diagnostics. In embodiments, the system and method provide for a threshold filter placed on the marginal probabilities.

In embodiments, the system and method provide for an accuracy check of the search by running the same search multiple times. In embodiments, the system and method provide for relationships between the nodes, e.g., as:

$$\prod_i^m P(H_i = h_i \mid D_{a(i)}^\vee, H_{ch(i)}^\vee) = \begin{cases} 1, & \forall j: D_j = 1 \Leftrightarrow D_j \text{ is annotated to term } i \\ 0, & \text{otherwise.} \end{cases}$$

the variables being defined herein.

In embodiments, the system and method provide for the relationships between the nodes, taking into context the false positives and false negatives, e.g., as follows:

$$\prod_{i=1}^m P(O_i \mid H_i, O_{pa(i)}^\wedge) = \beta^{m_{011|OH}}(1-\beta)^{m_{111|OH}}(1-\alpha)^{m_{001|OH}}\alpha^{m_{101|OH}},$$

where $$m_{xyz|OH} = |\{i \mid O_i = x \wedge H_i = y \wedge O_{pa(i)}^\wedge = z\}| \text{ and}$$

$$m = \sum_{x,y,z \in \{0,1\}} m_{xyz|OH},$$

the variables being defined herein.

In embodiments, the system and method provide for a threshold filter placed on the marginal probabilities, e.g., to decrease processing time, and limit the search output and/or display.

DETAILED DESCRIPTION OF EXAMPLE EMBODIMENTS

As mentioned in the Background Information section above, each entity in a domain is said to make up a term of the ontology. Exemplary embodiments of the present invention will be discussed in connection with a search database constructed using terms of an ontology. The ontology terms categorize a set of potential search results. Although the potential search results may, in practice, be included in the ontology—and therefore may also be considered ontology terms—the word "term" is used from hereon to refer only to the ontology terms that categorize the potential search results, so as to distinguish the potential search results from the terms that describe them.

System Overview

The present invention relates to methods and a system for conducting computer-assisted indexing and searching. Exemplary embodiments of the present invention relate to methods and a system for indexing a source of medical information to generate a search database. However, the methods and system of the present invention may be applied to other kinds of information. In alternative embodiments, the present invention may be applied to information concerning a social network, a dating service, or consumer products. Virtually any type of information that can be categorized according to the terms of an ontology may be used to form a search database according to the present invention. Likewise, the categories of search queries and potential search results are not limited to any particular type of information, and may involve any query that is of interest to the user.

Figure 1:
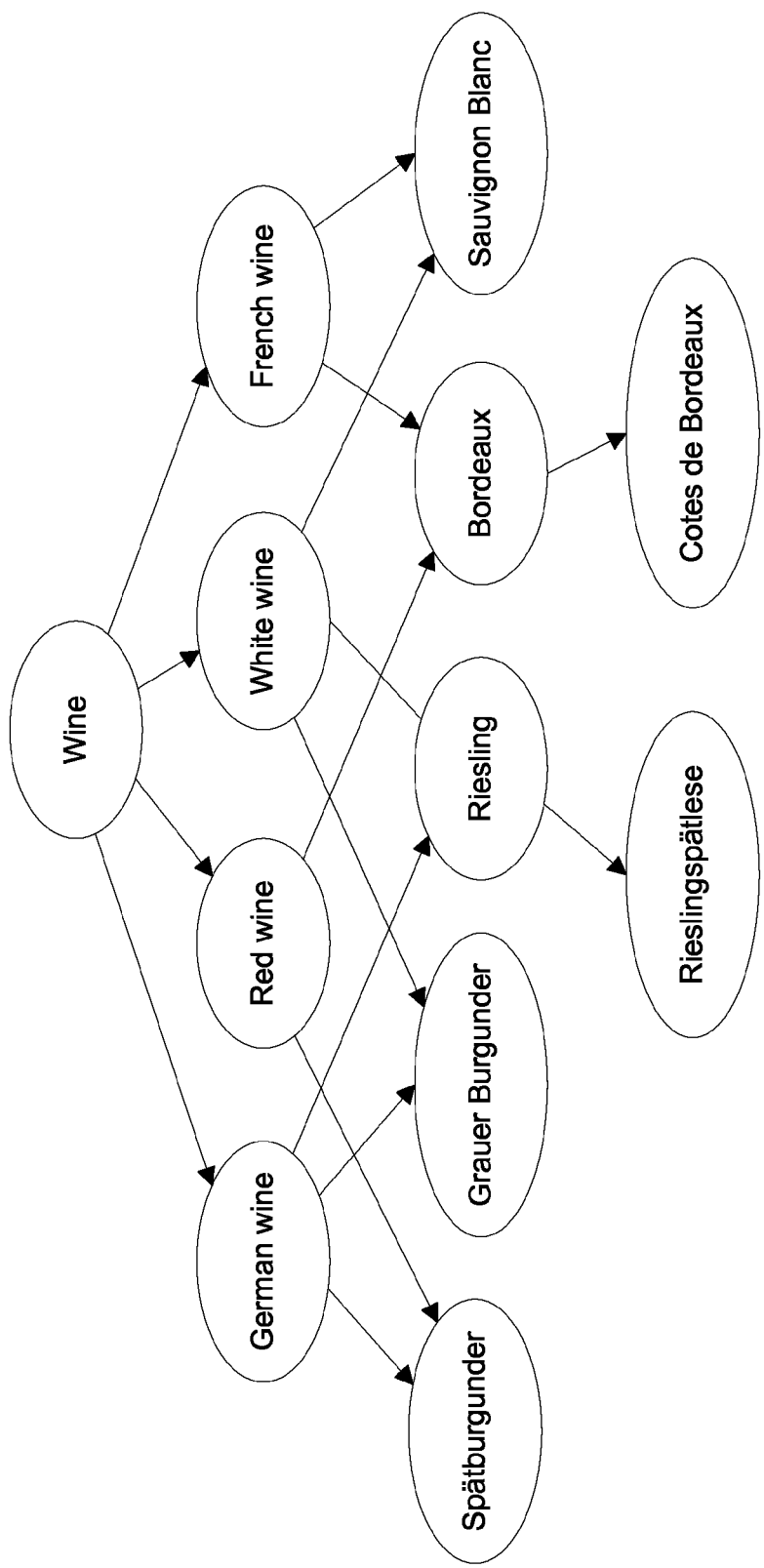
FIG. 1 is a directed acyclic graph of a domain ontology.
Figure 2:
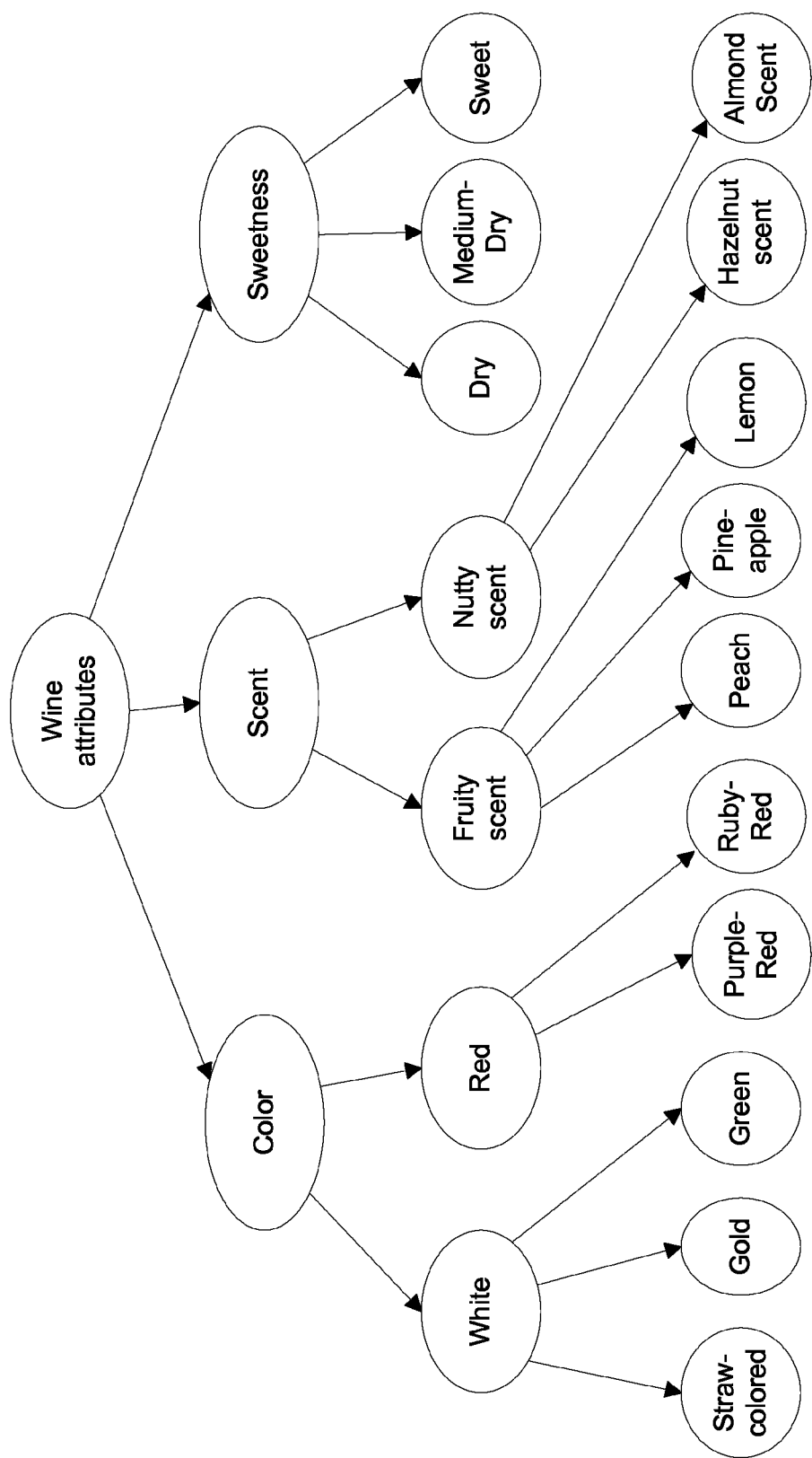
FIG. 2 is a directed acyclic graph of an attribute ontology.
Figure 3:
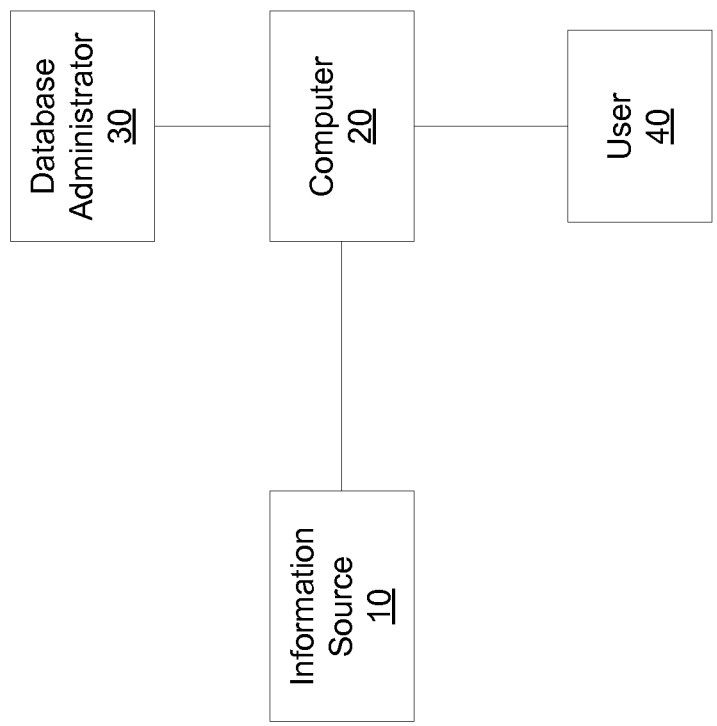
FIG. 3 is a block diagram of a system according to an example embodiment of the present invention.

FIG. 3 shows a block diagram of a system according to an example embodiment of the present invention. The system may include an information source 10 and a computer 20. The information source 10 may be an electronic data repository, such as a Web resource (e.g., a Web page or a file hosted on a Web server). Alternatively, the information source 10 may be a physical document or an actual person, such as a database administrator 30. In an example embodiment, the information source 10 is a Web-based encyclopedia of medical conditions.

The computer 20 may be a general computing device and may include a processor, a memory, a user interface (e.g., display monitor, keyboard and/or mouse), and a communication interface such as a network card or wireless adapter. The computer 20 is configured to store information obtained from the information source 10. The information is stored on the computer 20 in the form of a search database, which may be maintained by the administrator 30 and accessed by a user 40. The information may be transferred in any number of ways depending on the nature of the information source 10. Information from a physical document may be manually input into the computer 20 by the administrator 30 or any other person having possession of the physical document, as well as access to the computer 20. Information from a Web resource may be extracted over the Web by the computer 20. In the example of the Web-based encyclopedia, the data structure of the encyclopedia may be known, so that the computer 20 may be programmed to parse through the encyclopedia and extract specific items of data, such as names of medical conditions. The computer 20 may also be programmed to extract the ontology terms, e.g., symptoms and signs of the medical conditions. The computer 20 may be programmed to perform the parsing at specific intervals, e.g., weekly, in order to keep the database up-to-date. As will be explained below, the information may correspond to potential search results that are annotated to the terms of an ontology. It should be noted that the ontology terms need not come from the information source 10 and may, in fact, be obtained separately (e.g., from an ontology expert, the administrator 30, or a second information source).

The administrator 30 may have any number of roles with respect to construction and maintenance of the search database. In one embodiment, the administrator's role is limited to initiating the transfer of information from the information source 10 to the computer 20. In another embodiment, the administrator 30 is a programmer and an ontology expert, who not only initiates the information transfer, but also configures the search database by defining the semantic relationships of the ontology that describes the transferred information. In this regard, the administrator 30 may configure the database according to the semantic relationships of a pre-existing ontology (e.g., one that has been well-accepted by the medical community). On the other hand, the administrator 30 may have discretion to deviate from the pre-existing ontology, e.g., by modifying existing relationships or supplementing the pre-existing ontology with new terms and relationships.

The user 40 initiates searches of the database, which may be physically located in the computer 20 or on a separate computer to which the user 40 has access. For example, the user 40 may be a physician who accesses the computer 20 (e.g., a hospital server) via a remote connection to run a search, the results of which may be displayed on the physician's local computing device. Alternatively, the search may be performed locally by transferring the database, along with computer instructions that implement the search methods of the present invention, onto a non-transient computer-readable storage medium (e.g., a CD-ROM, a flash memory, or a DVD) and copying the contents of the storage medium onto the local computing device.

Search Database Structure

Figure 4:
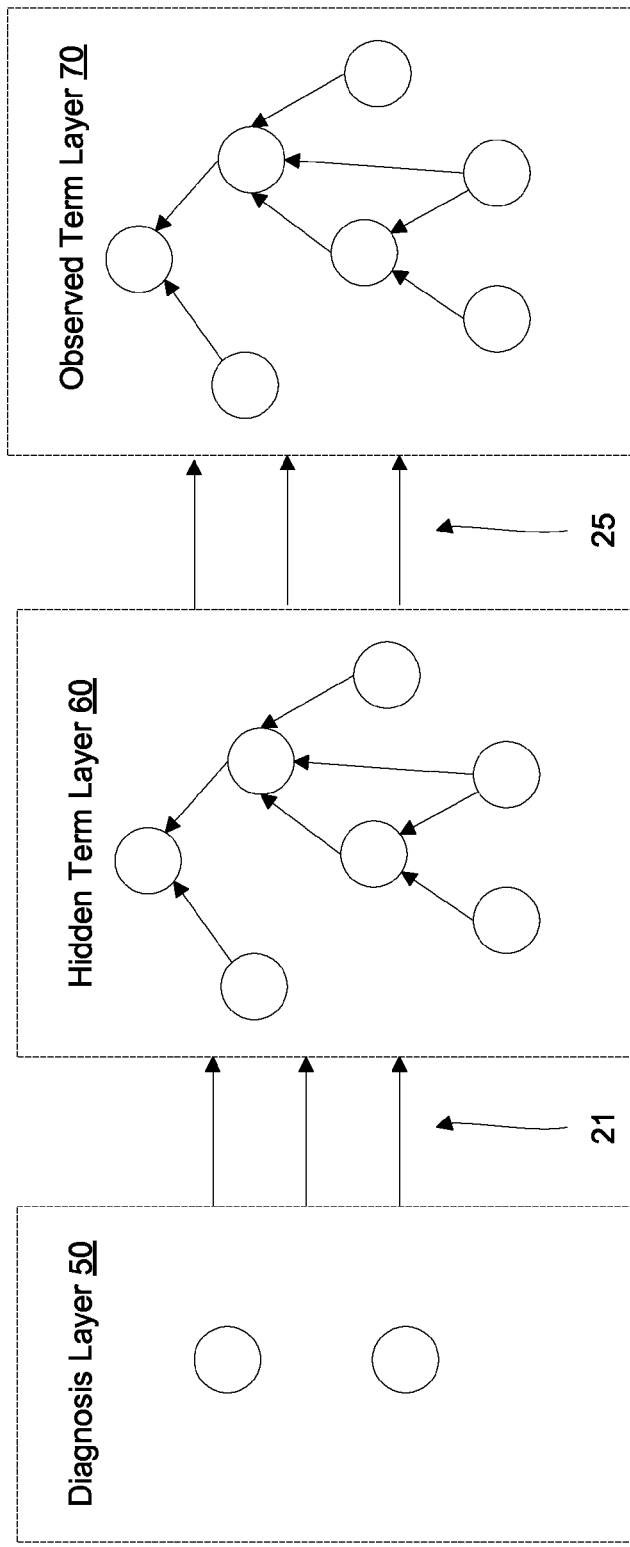
FIG. 4 is a block diagram of a search database according to an example embodiment of the present invention.

FIG. 4 shows a block diagram of a search database according to an example embodiment of the present invention. The database may be implemented as a network of nodes, in particular a Bayesian network. The nodes may be conceptually divided into three network layers. In keeping with the medical-application aspect of the present invention, the layers are referred to (for illustration purposes) as a diagnosis layer 50, a hidden term layer 60 and an observed term layer 70. In other embodiments, additional layers may be possible. For example, a search program may include a user interface that hides the observed term layer 70 from the user 40 via an additional layer, thereby performing a filtering of terms.

The diagnosis layer 50 corresponds to potential search results (e.g., medical conditions). Each node in the diagnosis layer 50 represents a different search result, which may be obtained from information source 10. The nodes in the diagnosis layer 50 are unconnected with each other, i.e., they are not explicitly related according to an ontology.

The observed term layer 70 corresponds to search queries, which are also user-observed characteristics of the potential search results. The search queries are derived from an ontology that categorizes the potential search results. Thus, the search queries and the potential search results are semantically-related. In the wine example, search queries may include "peach", "pineapple", "lemon", "hazelnut scent", and "almond scent". In the medical example, these may be symptoms or other signs of a medical condition, e.g., fever, cough, chills, headache, constipation, diarrhea, etc. The terms of the observed term layer 70 are, in general, more specific than the items of the diagnosis layer 50, i.e., the potential search results. That is, the items of the diagnosis layer 50 may be generalizations of the terms of the observed term layer 70.

The hidden term layer 60 corresponds to the same terms as those represented in the observed term layer 50. The nodes of the hidden layer 60 represent hidden (or true) states of their respective observed layer nodes. As explained below, each node of the network may include a status indicator. Whereas the status of the nodes in the observed term layer 50 reflect a user-observed state of a term (e.g., a particular symptom is observed as being present or not present), the status of the nodes in the hidden term layer 60 reflect the true states of their respective terms, which may not be the same as the observed states.

Terms represented in the hidden term layer 60 and the observed term layer 70 may be semantically-related to other terms of the same layer. This is illustrated by intra-layer connections (links) between the nodes. Therefore, the specificity level of terms in the same layer may vary.

Nodes of the diagnosis layer 50 are connected to nodes of the hidden term layer 60 in accordance with semantic relationships specified by the ontology. This is illustrated in FIG. 4 by a set of connections 21 between the diagnosis layer 50 and the hidden term layer 60. A set of connections 25 between the hidden term layer 60 and the observed term layer 70 represent the one-to-one correspondence between the nodes of these two layers. In this manner, items of the diagnosis layer 50 may be annotated to terms of the hidden term layer 60 via the connections 21, which in turn may be annotated to terms of the observed term layer 70 via the connections 25. According to an example embodiment of the present invention, connections between the diagnosis layer 50 and the hidden term layer 60 may include multiple connections to the same node. Thus, each diagnosis layer item can annotate one or more terms of the hidden term layer 60.

Annotation Propagation Rule and Introduction to Mathematical Notation

Each node in the network may include a status indicator, e.g., "ON" or "OFF", which can be represented using a Boolean variable (1 or 0). From the perspective of the user, ON status may indicate that a particular term of the observed term layer 70 has been observed (e.g., the physician observed swelling of the lymph nodes). OFF status may indicate that a term has not been observed (e.g., the physician did not observe the patient coughing, or the patient tells the physician that he has not been coughing) or indicate that the status of the term is yet unknown (e.g., the physician is awaiting the results of a blood test). In an alternative embodiment, nodes may include additional statuses (e.g., a separate status to indicate the unknown state). The number of statuses per node will vary depending on the nature of the information being indexed. For example, certain types of data may require numerical status values that cannot be expressed using Boolean variables such as ON and OFF. With respect to the nodes that represent the search result items, the status of these nodes is referred to as being either true or false.

As touched upon in the Background Information section above, the annotation propagation rule states that if one item is annotated to a term, then it is also annotated to all terms connected to that term along specific relations. One example of a semantic relationship that triggers the annotation propagation rule is the "is_a" relationship, i.e., whether A is a form or sub-category of B. For example, diarrhea is a form of gastro-intestinal ailment. Therefore, if diarrhea is observed, then gastro-intestinal ailment is necessarily also observed. Thus, if the status of the node representing diarrhea is set to ON, the status of the node representing gastro-intestinal ailment should also be turned ON.

If the status of a node in the diagnosis layer 50 is ON, then the potential search result represented by that node is in a "true" state (e.g., a particular medical condition exists). Under the annotation propagation rule, if a node of the hidden layer 60 is ON, then all ancestors of that node are also ON. Correspondingly, if the status of a node in the hidden layer 60 is OFF, then all descendants of that node are also OFF. The details of the annotation propagation rule are known in the art and will not be discussed further.

The present invention will be explained using various mathematical equations. The notations and naming conventions of these equations is now introduced in connection with FIG. 5, which shows diagnosis and hidden term layers of a network according to an example embodiment of the present invention. The status variables of the nodes in the diagnosis layer 50, the hidden term layer 60, and the observed term layer 70 (not shown) are respectively denoted as $D_1, \ldots, D_n$, $H_1, \ldots, H_m$, and $O_1, \ldots, O_m$.

Items of the diagnosis layer 50 are denoted by the variable j. The terms of the ontology are denoted with the variable i. For example, the sixth term of the hidden term layer 60 can be expressed as $H_i$, where i=6.

Subscripts and set notation are used to refer to corresponding sets of random variables, e.g., $O_{\{1,2\}}$ refers to $\{O_1, O_2\}$.

The set of parents for a term i is denoted by pa(i).

The set of direct children of term i is denoted by ch(i).

The set of diagnosis layer items to which a term i in the hidden term layer 60 is directly annotated is denoted by a(i).

Figure 5:
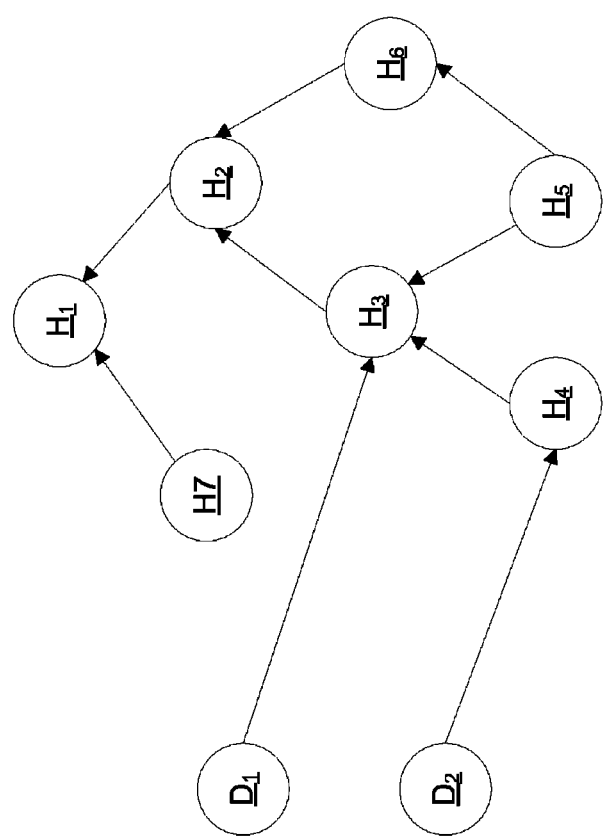
FIG. 5 is a network graph showing two layers of a network in a search database according to an example embodiment of the present invention.

Applying the above notations to the network of FIG. 5, the status of the network can be expressed as follows:

a(2)={ }, pa(2)={1}, ch(2)={3, 6}.
a(3)={1}, pa(3)={2}, ch(3)={4, 5}.
a(4)={2}, pa(4)={3}, ch(4)={ }.

$X^V$ is a Boolean variable that denotes the logical disjunction of a set of random variables X. That is, $X^V=1$ if-and-only-if (iff) there is any $X_i \in X$ with $X_i=1$, otherwise $X^V=0$.

$X^\wedge$ is a Boolean variable that denotes the logical conjunction of a set of random variables X. That is, $X^\wedge=1$ iff all members of X are 1, otherwise $X^\wedge=0$.

Local Probability Distribution of Terms in the Hidden Term Layer

As discussed above, the status of a node may be propagated under the annotation propagation rule. When the status of a node is propagated, the LPD (i.e., the probability distribution of the nodes in a particular layer) may change. For example, regarding the LPD of the hidden term layer 60, if a term i in the hidden term layer 60 is ON, then we know that an item j directly annotated to the term i is true. However, if none of the diagnosis layer items j are in the true state (which is initially the case whenever a new search is performed), then the state of a term i in the hidden term layer 60 depends on whether a child term of i is ON. The LPD of a node representing a term $H_i$ can be expressed with the following equations:

$$P(H_i=1 | D_{a(i)}^V, H_{ch(i)}^V) = \max\{D_{a(i)}^V, H_{ch(i)}^V\} \quad (11.1)$$

$$P(H_i=0 | D_{a(i)}^V, H_{ch(i)}^V) = 1 - \max\{D_{a(i)}^V, H_{ch(i)}^V\} \quad (11.2)$$

Equations 11.1 and 11.2 state that if any of the diagnosis layer items are true, or if any of the children of $H_i$ are ON, then the probability of being ON is equal to 1. Otherwise, the probability of $H_i$ being OFF is equal to 1.

Additionally, the following is also true:

$$\prod_i^m P(H_i = h_i | D_{a(i)}^V, H_{ch(i)}^V) = \begin{cases} 1, & \forall j: D_j = 1 \Leftrightarrow D_j \text{ is annotated to term } i \\ 0, & \text{otherwise.} \end{cases} \quad (11.3)$$

Equation 11.3 states that if a diagnosis layer item is true, then all of the terms annotated to that item (whether by directing linking of nodes or by operation of the annotation propagation rule) must be ON.

False-Positives, False-Negatives, and the Local Probability Distribution of Terms in the Observed Term Layer According to an example embodiment of the present invention, the LPD of the nodes in the observed term layer 70 may be calculated by taking into consideration known FP and FN rates between terms in the observed term layer 70 and terms in the hidden term layer 60. The variables $\alpha$ and $\beta$ respectively denote an FP rate and an FN rate, which apply to all of the terms in the observed term layer 70. Within the framework of the database of the present invention, false-positives occur when a term in the observed term layer is ON, even though the diagnosis layer item that is true is not annotated by that term, i.e., the observed layer term is unrelated to the diagnosis layer item that is true. False-negatives occur when an item in the diagnosis layer is true, yet an observed layer term that corresponds to a hidden layer term annotated by the true diagnosis layer item is OFF.

Figure 6B:
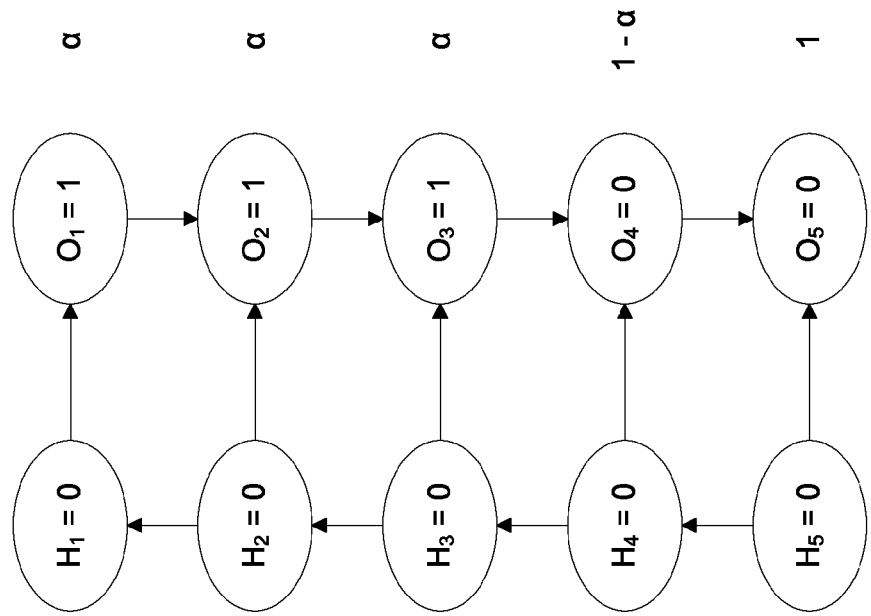
FIG. 6B is a network graph showing the propagation of false positive search queries in a search database according to an example embodiment of the present invention.
Figure 6A:
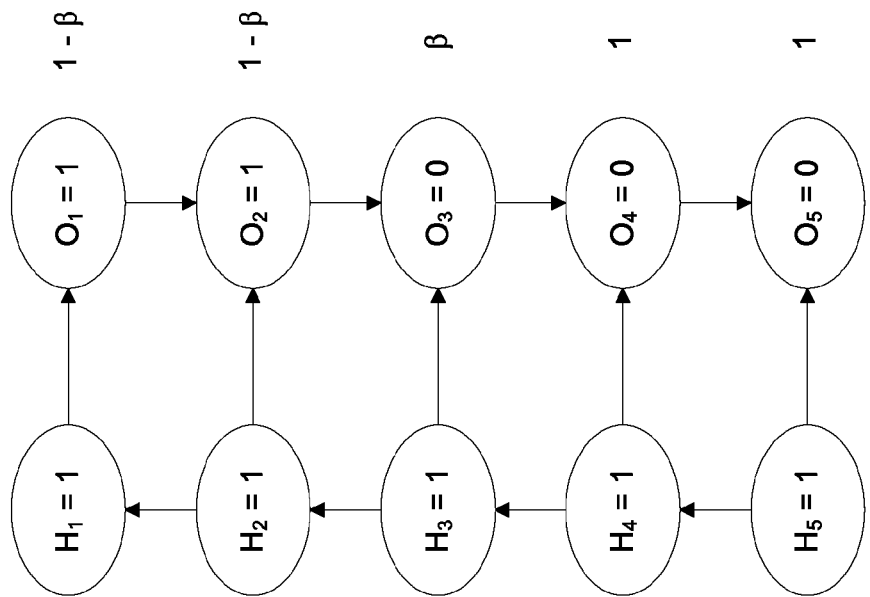
FIG. 6A is a network graph showing the propagation of false negative search queries in a search database according to an example embodiment of the present invention.

FIG. 6A is a network graph showing the propagation of false negative search queries in a search database according to an example embodiment of the present invention. For illustration purposes, a linear ontology is shown. Suppose that $H_5$ is ON. This would be propagated via the annotation propagation rule to nodes $H_4$, $H_3$, $H_2$, and $H_1$. Further, this means that nodes $O_1$ to $O_5$ should also be ON. However, if $O_3$ is false-negative, then its OFF status is propagated in a top-down fashion to $O_4$ and O. However, because the OFF status of $O_4$ can be explained by the OFF status of $O_3$, only one false-negative may be counted per branch (at the earliest ancestor). Based on this observation, the LPD of the nodes in the observed term layer 70 can be expressed as a function of the FN rate using the following equations:

$$P(O_i=0 | H_i=1, O_{pa(i)}^\wedge=0)=1 \quad (11.4)$$

$$P(O_i=1 | H_i=1, O_{pa(i)}^\wedge=0)=0 \quad (11.5)$$

$$P(O_i=0 | H_i=1, O_{pa(i)}^\wedge=1)=\beta \quad (11.6)$$

$$P(O_i=1 | H_i=1, O_{pa(i)}^\wedge=1)=1-\beta \quad (11.7)$$

Equations 11.4 and 11.5 state that if all parents of an observed layer term $O_i$ are OFF, then $O_i$ itself must be OFF, even if $H_i$ is ON. Equations 11.6 and 11.7 take the FN rate into consideration and state that the probability of a term $O_i$ being OFF, even though its corresponding hidden layer term $H_i$ is ON and the parent(s) of $O_i$ are ON, is determined by $\beta$.

FIG. 6B is a network graph showing the propagation of false positive search queries in a search database according to an example embodiment of the present invention. The network is the same as that of FIG. 6A, except that $O_3$ is now false-positive. The ON status of $O_3$ is propagated to $O_2$ and $O_1$ in a bottom-up fashion, so that three false-positives are counted. Based on this observation, the LPD of the terms in the observed term layer 70 can be expressed as a function of the FP rate using the following equations:

$$P(O_i=0|H_i=0, O^\wedge_{pa(i)}=0)=1 \quad (11.8)$$

$$P(O_i=1|H_i=0, O^\wedge_{pa(i)}=0)=0 \quad (11.9)$$

$$P(O_i=0|H_i=0, O^\wedge_{pa(i)}=1)=1-\alpha \quad (11.10)$$

$$P(O_i=1|H_i=0, O^\wedge_{pa(i)}=1)=\alpha \quad (11.11)$$

Equations 11.8 and 11.9 state that the probability of a term $O_i$ being OFF, given that its parent term(s) and its corresponding hidden term $H_i$ are also OFF, is equal to 1. Equations 11.10 and 11.11 state that the probability of a term $O_i$ being ON given that its corresponding hidden term is OFF while its parent(s) are ON, is determined by $\alpha$.

Based on the equations discussed up to this point, a joint probability distribution (JPD) for the entire network can be expressed using the following equations:

$$P(D, H, O) = P(D) \prod_{i=1}^{m} [P(O_i | H_i, O^\wedge_{pa(i)}) P(H_i | D^\vee_{a(i)}, H^\vee_{ch(i)})]. \quad (11.12)$$

$$\prod_{i=1}^{m} P(O_i | H_i, O^\wedge_{pa(i)}) = \quad (11.13)$$

$$\beta^{m_{011|OH}} (1-\beta)^{m_{111|OH}} (1-\alpha)^{m_{001|OH}} \alpha^{m_{101|OH}},$$

where $m_{xyz|OH} = |\{i | O_i = x \wedge H_i = y \wedge O^\wedge_{pa(i)} = z\}|$ and $$m = \sum_{x,y,z \in \{0,1\}} m_{xyz|OH}.$$

Equation 11.13 is a simplification of an expression in Equation 11.12.

Probabilistic Inference in a Bayesian Network

Probabilistic inference refers to the process of inferring the state of the entire system (in particular, the states of the potential search results) from the observed states of the search queries. In the medical example, it is the process of analyzing the observed symptoms and signs to determine the probability of existence (true or false) of each medical condition. Before turning to the details of how a probabilistic inference is performed in a network that takes into consideration FPs, FNs, and frequency information, it will be helpful to explain probabilistic inference in the absence of these additional features.

The conditional probability of the items in the diagnosis layer 50 is given by Bayes' Theorem which, in the framework of the database of the present invention, can be expressed using the following equation:

$$P(D | O) = \frac{P(D, O)}{P(O)} = \frac{\sum_H P(D, H, O)}{P(O)}. \quad (11.14)$$

The numerator of Equation 11.14 is given by:

$$\sum_H P(D, H, O) = \quad (11.15)$$

$$P(D) \sum_{H \in \{0,1\}^m} \left[ \prod_{i=1}^{m} P(O_i | H_i, O^\wedge_{pa(i)}) P(H_i | D^\vee_{a(i)}, H^\vee_{ch(i)}) \right].$$

Equation 11.15 can be simplified to:

$$\sum_H P(D, H, O) = P(D) \prod_{i=1}^{m} P(O_i | H_i = h_i^D, O^\wedge_{pa(i)}). \quad (11.16)$$

Another way of expressing Equation 11.15 is:

$$\sum_H P(D, H, O) = P(D) P(O | D). \quad (11.17)$$

Probabilistic inference may be performed by using Equation 11.16 to calculate, for each diagnosis layer item, the joint probability of the query terms and the diagnosis layer item. The diagnosis layer items may then be ranked based on the joint probabilities. Because search queries are generally directed to obtaining the best matching search result, the calculation may be simplified by limiting the analysis to network configurations in which only one diagnosis layer item is true at a time. Accordingly, the following expression for the marginal probability of a diagnosis layer item $d_i$ can be used instead of Equation 11.16:

$$P(d_i | O) = \frac{P(O | d_i) P(d_i)}{P(O)} = \frac{P(O | d_i)}{\sum_{j=0}^{n} P(O | d_j)}. \quad (11.18)$$

Equation 11.18 expresses the probability of the existence of any individual diagnosis layer item, given the observed existence of one or more terms in the observed term layer 70.

Accounting for False-Positives and False-Negatives

According to an example embodiment of the present invention, FPs and FNs may be accounted for by adding supplementary nodes to the observed term layer 70; one node A representing $\alpha$ and another node B representing $\beta$. A and B are common inputs (i.e., connected) to each node in the observed term layer 70. In this manner, the ON/OFF statuses of A and B (which are changed in accordance with $\alpha$ and $\beta$ by a computer-executed model) can be propagated to influence the LPD of the observed term layer 70. A and B can be represented as a single variable $\theta = (A, B)$. Using this notation, the likelihood $P(O|D)$ becomes:

$$P(O | D, \theta) = \quad (11.19)$$

$$\sum_{H \in \{0,1\}^m} \prod_{i=1}^{m} \left[ P(H_i | D^\vee_{a(i)}, H^\vee_{ch(i)}) \sum_\theta P(\theta) P(O_i | H_i, O^\wedge_{pa(i)}, \theta) \right],$$

The values of $\alpha$ and $\beta$ correspond to known FP and FN rates, which are predetermined (i.e., not user-specified) and integrated out by performing probabilistic inference. However, in some embodiments the user 40 may have the option to specify the value of $\alpha$ or $\beta$ for a specific term (e.g., setting $\beta$ equal to zero for a user-selected term). When $\alpha$ or $\beta$ are user-specified, term-specific nodes may be added in a similar fashion as nodes A and B.

Accounting for Frequency Information

According to an example embodiment of the present invention, the calculation of the marginal probabilities of the terms in the diagnosis layer 50 takes into consideration information about the frequency with which annotations occur between the items of the diagnosis layer 50 and the terms of the hidden term layer 60. In the medical example, the frequency information may be used to apply different weights to symptoms that are present only in a certain proportion of all patients with some disease, say, that fever is found in only 30% of patients with the common cold). In other words, if a symptom X is more likely to occur in disease A than in disease B, then (all else being equal) a patient with symptom X is more likely to have disease A than disease B.

Using the frequency information, the LPDs of the nodes in the hidden term layer 60 may be expressed by supplementing Equations 11.1 and 11.2 with Equations 11.20 to 11.23 below. The variable $f_{j,i}$ is used to denote the frequency with which term i occurs in conjunction with item j. The expression $D=d_j$ is used to denote a configuration in which only the diagnosis layer item j is true:

$$P(H_i=1|D_{a(i)}, D=d_j, H_{ch(i)}^V=0) = f_{j,i} \quad (11.20)$$

$$P(H_i=0|D_{a(i)}, D=d_j, H_{ch(i)}^V=0) = 1-f_{j,i} \quad (11.21)$$

$$P(H_i=1|D_{a(i)}, D=d_j, H_{ch(i)}^V=1) = 1 \quad (11.22)$$

$$P(H_i=0|D_{a(i)}, D=d_j, H_{ch(i)}^V=1) = 0 \quad (11.23)$$

It should be noted that with the addition of Equations 11.20 to 11.23 above, Equation 11.13 is no longer valid and cannot be used to simplify the calculation of Equation 11.12.

In another example embodiment of the present invention, the calculations of the LPDs based on equations 11.1, 11.2, and 11.20 to 11.23 may be limited to being performed for a finite number of frequency-based annotations. This may be done to conserve computing resources, since the number of network configurations that need to be explored grows exponentially with the number of frequency-based annotations. The LPD calculations are only performed for the k annotations that have the lowest frequency, while assuming that the remaining annotations are always present (i.e., assuming a frequency of 1). Other techniques for simplifying the LPD calculations may exist, including selective sampling (e.g., random sampling) or approximate Bayesian inference algorithms.

FIGS. 7A to 7D each show frequency-based probabilities of nodes in different possible network configurations according to example embodiments of the present invention. In FIGS. 7A to 7D, node $D_2$ is true and node $D_1$ is false. Since $D_2$ is connected to $H_4$ and $H_7$, there are four possible configurations.

Figure 7A:
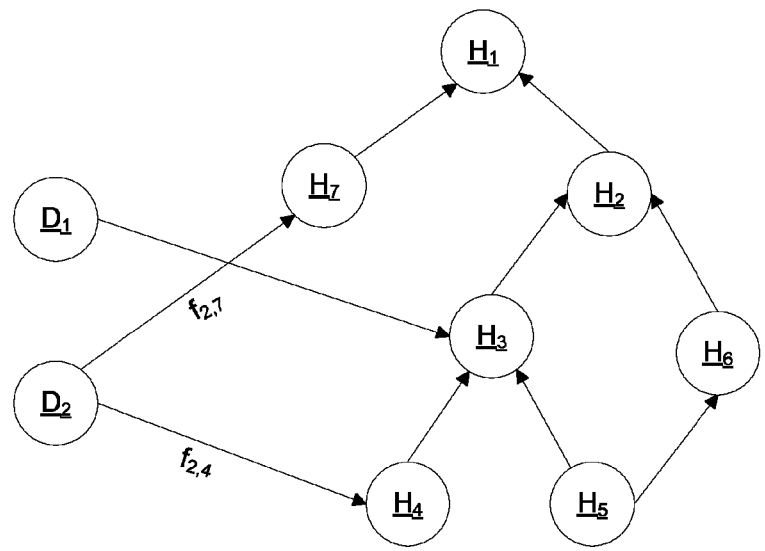
FIGS. 7A to 7D each show frequency-based probabilities of nodes in different possible network configurations according to example embodiments of the present invention.

FIG. 7A is a configuration in which $H_4$ and $H_7$ are both ON. The probability that $H_4$ is ON is denoted by $f_{2,4}$ and the probability that $H_7$ is ON is denoted by $f_{2,7}$. Correspondingly, the probability that $H_4$ is OFF is denoted by $1-f_{2,4}$ and the probability that $H_7$ is OFF is denoted by $1-f_{2,7}$. Using these expressions, the probability of the configuration in FIG. 7A is $f_{2,4} f_{2,7}$.

Figure 7B:
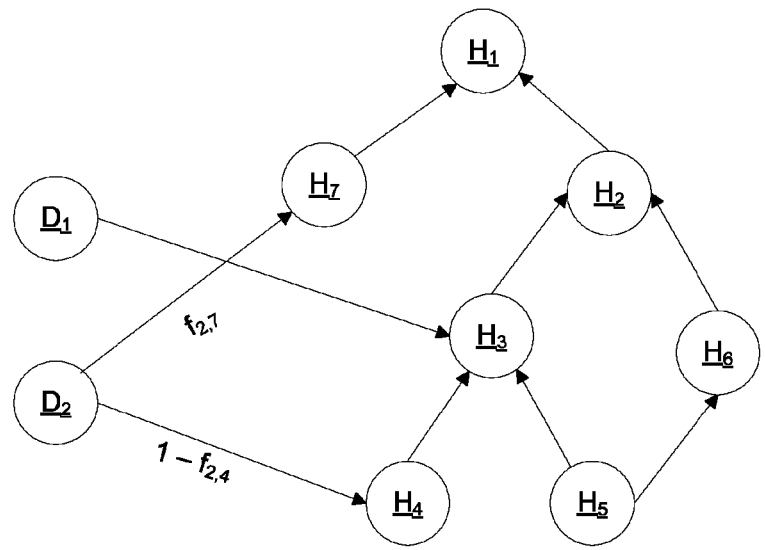

FIG. 7B is a configuration in which $H_4$ is OFF and $H_7$ is ON. The probability of the configuration in FIG. 7B is $(1-f_{2,4})f_{2,7}$.

Figure 7C:
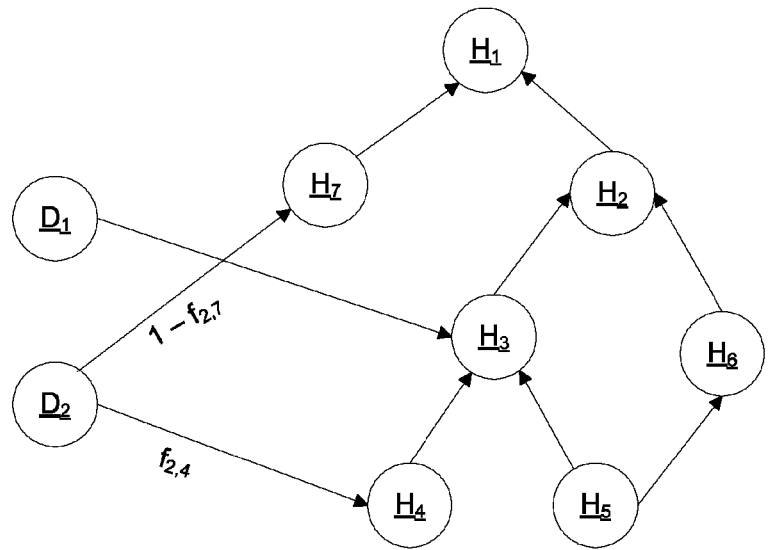

FIG. 7C is a configuration in which $H_7$ is OFF and $H_4$ is ON. The probability of the configuration in FIG. 7B is $(1-f_{2,7})f_{2,4}$.

Figure 7D:
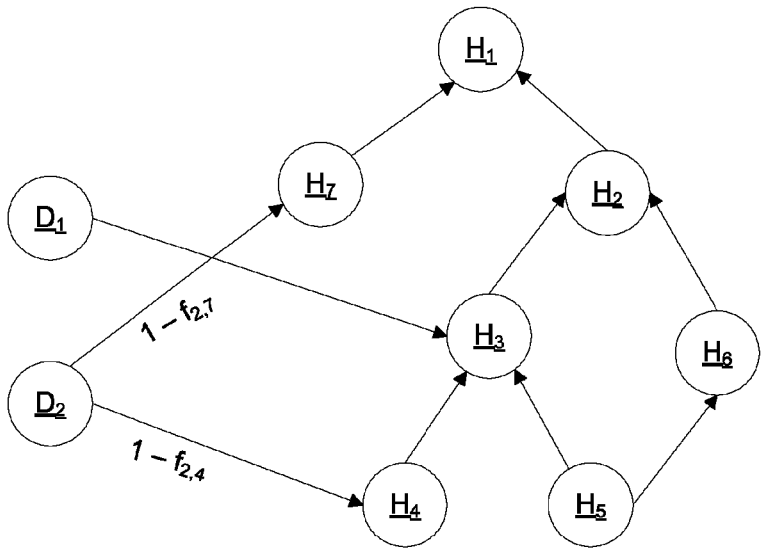

FIG. 7D is a configuration in which $H_4$ and $H_7$ are both OFF. The probability of the configuration in FIG. 7C is $(1-f_{2,4})(1-f_{2,7})$.

Method Overview

Example embodiments of methods for constructing a search database (i.e., indexing) and performing searching according to the present invention will now be described. The methods may be implemented using any of the embodiments of the system described above.

Figure 8:
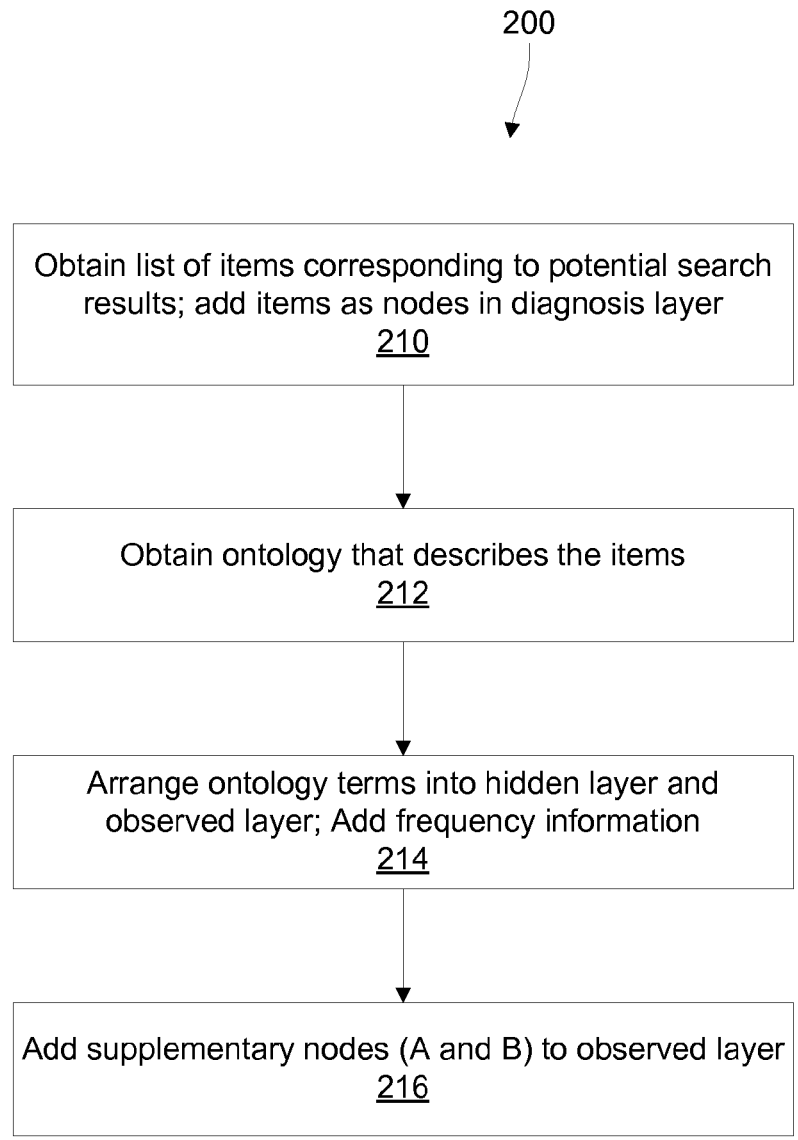
FIG. 8 is a flowchart showing a computer-assisted method for indexing according to an example embodiment of the present invention.

FIG. 8 is a flowchart showing a computer-assisted method 200 for constructing a search database according to an example embodiment of the present invention. In an example embodiment, the method 200 begins at 210, where a list of items corresponding to potential search results are obtained, e.g., from the information source 10. The information items are then added to the network as nodes in the diagnosis layer 50.

At 212 an ontology describing the items represented by the diagnosis layer nodes is obtained.

At 214, the terms of the ontology are added to the network as nodes in the hidden term layer 60 and the observed term layer 70. The nodes of the various layers are then connected (both intra-layer and inter-layer connections) in the manner previously described, e.g., in accordance with semantic relationships specified by the ontology. At this time, if frequency information is available, the frequency information may be mapped to the nodes of the hidden term layer 60, e.g., as part of a data structure that implements each node, or in a separate database.

At 216, supplementary nodes A and B are added to the observed term layer 70.

Figure 9:
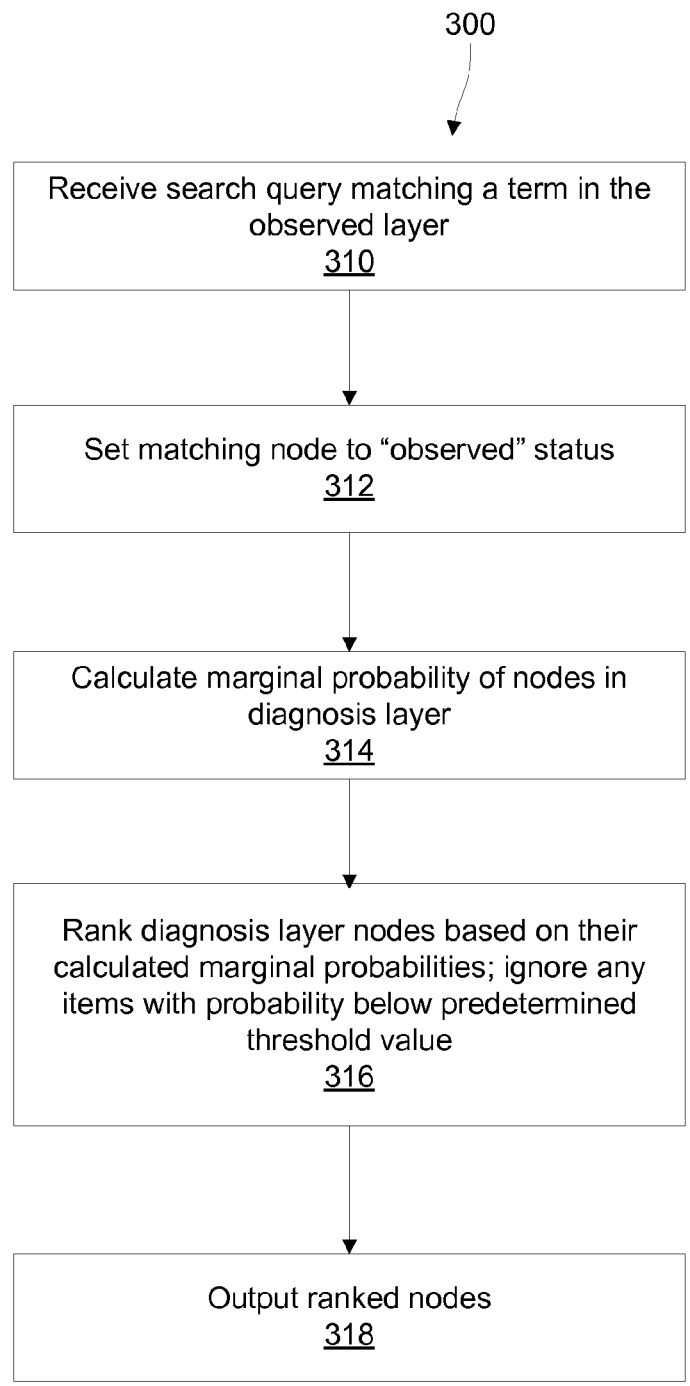
FIG. 9 is a flowchart showing a computer-assisted method for conducting a search in a search database according to an example embodiment of the present invention.

FIG. 9 is a flowchart showing a computer-assisted method 300 for conducting a search in a search database according to an example embodiment of the present invention. In an example embodiment, the method 300 begins at 310, where a search query matching a term in the observed term layer 70 is input by the user 40. At this time, the status of each of the nodes in the hidden term layer 60 and the observed term layer is OFF. Similarly, the status of each node in the diagnosis layer 50 is false.

At 312, the status of the matching node is updated to "observed", i.e., ON.

At 314, the marginal probability of each node in the diagnosis layer 50 is calculated based on the ON status of the matching node, e.g., via a computer-executed algorithm that implements the equations discussed above. As noted above, the marginal probability calculation takes into consideration the FP and FN rates, as well as the frequency information.

At 316 the diagnosis layer nodes are ranked based on their calculated marginal probabilities. An optional thresholding may be performed by ignoring any nodes that have a calculated probability below a predetermined threshold value.

At 318, the ranked nodes are output as search results, e.g., displayed to the user as a sorted list. The displaying may include the names of the items represented by the ranked nodes, along with their respective marginal probability values.

The method 300 may be repeated each time the user 40 inputs a new search query and without resetting the statuses of the nodes, thereby providing real-time search results. A search algorithm according to the present invention may wait until all search queries have been entered before performing the method 300. Multiple search queries may be input by reading a new query at the end of each step 318. Alternatively, multiple search queries may be input as a single text string that is read once and parsed into its query components (e.g., each word may constitute a separate query).

The system and methods of the present invention have been described in connection with the diagnosis of medical conditions. In this context, frequency information may correspond to recorded occurrences of clinical abnormalities for the potential medical conditions (e.g., recorded in medical studies).

Other applications of the present invention include social-networking, dating, shopping, and Web-based searching. In the social-networking context, the present invention may obtain, as search queries, information about the user and provide for searching of friends with similar interests or for suggesting "important" messages (e.g., keywords that can be added to a blog entry) to increase the visibility of the user's Web page. Frequency information may correspond to the user's likes and dislikes.

In the dating context, search queries may correspond to characteristics that the user is looking for in a potential dating partner. Frequency information may correspond to the user's likes and dislikes, or to success statistics of previous matching attempts for the user.

In the shopping context, the potential search results may correspond to new products of potential interest to the user. Frequency information may correspond to recorded instances of the buying behavior of the user, product-evaluation scores for the user (e.g., in a consumer marketing survey), or product-viewing statistics for the user.

In the Web-based searching context, the database may be constructed using Web resources, such as Web sites and Web-accessible documents. Frequency information may correspond to frequencies with which the Web resources occur in conjunction with the occurrence of the information being searched for.

In the preceding specification, the present invention has been described with reference to specific example embodiments thereof. It will, however, be evident that various modifications and changes may be made thereunto without departing from the broader spirit and scope of the present invention as set forth in the claims that follow. The embodiments described herein may be presented combined with and without each other in various combinations. For example, the example method of FIG. 8 for constructing the search database may be used to implement the example system of FIG. 3 and the method of FIG. 9 may be used to implement a search algorithm in conjunction with the example system. Further, various features of the different embodiments can be used in other embodiments. The specification and drawings are accordingly to be regarded in an illustrative rather than restrictive sense.

What is claimed is:

1. A method for constructing a search database using an ontology, the method comprising:
   via at least one processor:
   obtaining a list of items, each item corresponding to a potential search result;
   obtaining a list of terms from an ontology that describes all of the items, each term being an attribute of a corresponding item;
   dividing the terms into user-selectable search queries and non-selectable terms;
   activating the items and the terms as nodes in a network, wherein:
      the nodes are connected based on semantic relationships specified by the ontology,
      the network has three layers, a first layer including a node for each of the items, a second layer including a node for each search query, and a third layer including a node for each non-selectable term,
      the second layer nodes correspond to user-observed states of their respective terms, and
      the third layer nodes correspond to hidden states of the terms represented in the second layer; and
   configuring the network such that a probability of nodes in the first layer is determined by updating states of nodes in the third layer:
      deterministically based on the semantic relationships, and
      probabilistically based on at least one of (ii) frequency information indicating a frequency with which a term of a node in the third layer is known to occur when an associated item of a node in the first layer also occurs and (ii) a predefined false positive or false negative rate.

2. The method of claim 1, further comprising:
   adding intra-layer connections to the second and the third layers to control propagation of annotations throughout the network.

3. The method of claim 1, further comprising:
   adding two additional nodes to the network, wherein a first one of the additional nodes influences a local probability distribution of the nodes in the third layer in accordance with the false positive rate and a second one of the additional nodes influences the local probability distribution of the nodes in the third layer in accordance with the false negative rate.

4. The method of claim 1, further comprising:
   receiving from a user a selection of a term represented in the second layer together with a user-specified rate corresponding to one of a false-positive rate and a false-negative rate for the user-selected term; and
   adding at least one additional node to the network, wherein the at least one additional node influences a local probability distribution of the nodes in the third layer in accordance with the user-specified rate.

5. The method of claim 1, further comprising:
   storing a processor-executed model that expresses a local probability distribution of the terms in the third layer as a function of the frequency information.

6. A method for conducting a search using an ontology-based search database, the method comprising:
   via at least one processor: performing the following using a search database that includes a first set of nodes corresponding to potential search results, a second set of nodes corresponding to entity-selectable search queries that are also terms of an ontology describing all of the potential search results, wherein each term is an attribute of a corresponding potential search result, and a third set of nodes corresponding to non-selectable terms that represent hidden states of the second set of nodes, wherein the nodes of the search database are connected in accordance with semantic relationships specified by the ontology and activated in response to search queries:
   obtaining, from a user, a search query matching one of the entity-selectable search queries;
   changing, in response to obtaining the query, a state of the node corresponding to the matching search query to an activated state;
   propagating the change in state of the node to at least one other node in the network, wherein the at least one other node includes a node in the third set of nodes, and the propagating is performed:
      deterministically based on the semantic relationships, and
      probabilistically based on at least one of (ii) frequency information indicating a frequency with which a term of a node in the third set of nodes is known to occur when an associated item of a node in the first set of nodes also occurs and (ii) a predefined false positive or false negative rate;

after the propagating, calculating a marginal probability value for each node of the first set of nodes based on the states of the third set of nodes; and outputting a search result ranking, ordered according to the calculated marginal probability values.

7. The method of claim 6, wherein each set of nodes forms a respective layer in the network, and the propagation is controlled via intra-layer connections in the layers corresponding to the second and the third set of nodes.

8. The method of claim 6, wherein the marginal probability values are calculated while taking into consideration propagation-induced probability effects of two additional nodes, which respectively correspond to the false-positive rate and the false-negative rate.

9. The method of claim 6, wherein the marginal probability values are calculated while taking into consideration propagation-induced probability effects of an additional node that corresponds to an entity-specified false-positive or false-negative rate for an entity-selected search query term.

10. The method of claim 6, further comprising:
calculating, as a function of the frequency information, a local probability distribution of the third set of nodes, wherein the marginal probability values are calculated based on the local probability distribution.

11. The method of claim 10, wherein the frequency is a frequency with which a word or concept corresponding to the non-selectable term is used in a document containing the associated one of the potential search results.

12. The method of claim 6, wherein a plurality of search queries are input, and the search results ranking is updated in response to each search query without resetting the states of the nodes in the network.

13. The method of claim 6, wherein the state of each node in the second set of nodes includes an observed state, a non-observed state and a third state representing a state of unknown status.

14. The method of claim 6, wherein:
the potential search results are Web resources, including at least one of Web sites and Web-accessible documents;
the ontology classifies the Web resources according to Web categories; and
frequencies with which the Web resources occur are used to capture a relevance of a particular Web resource with respect to any of the Web categories, and to adjust the calculating of the marginal probability values.

15. The method of claim 6, wherein:
the database includes items obtained from a social network;
the potential search results correspond to potential new friends with similar interests to the user; and
frequency information corresponding to likes and dislikes of an entity is used to adjust the calculating of the marginal probability values.

16. The method of claim 6, wherein:
the database includes items corresponding to consumer products;
the potential search results correspond to new products of potential interest to the user; and
frequency information corresponding to at least one of a recorded buying behavior of the user, product-evaluation scores of the user, and product-viewing statistics of the user, is used to adjust the calculating of the marginal probability values.

17. The method of claim 6, wherein:
the database includes items obtained from a dating service;
the potential search results correspond to potential new dating partners; and frequency information corresponding to at least one of likes and dislikes of the entity, and success statistics of previous matching attempts for the entity, is used to adjust the calculating of the marginal probability values.

18. The method of claim 6, wherein:
the database includes items obtained from a medical information source;
the potential search results correspond to potential medical conditions; and
frequency information corresponding to a recorded occurrence of clinical abnormalities for the potential medical conditions is used to adjust the calculating of the marginal probability values.

19. A system for conducting a search using an ontology-based search database, the system comprising:
a search database that includes a first set of nodes corresponding to potential search results, a second set of nodes corresponding to entity-selectable search queries that are also terms of an ontology describing all of the potential search results, wherein each term is an attribute of a corresponding potential search result, and a third set of nodes corresponding to non-selectable terms that represent hidden states of the second set of nodes, wherein the nodes of the search database are connected in accordance with semantic relationships specified by the ontology and activated in response to search queries; and
at least one computer, wherein a processor of the at least one computer executes program instructions to perform the following:
obtaining a search query matching one of the entity-selectable search queries;
changing, in response to obtaining the query, a state of the node corresponding to the matching search query to an activated state;
propagating the change in state of the node to at least one other node in the network, wherein the at least one other node includes a node in the third set of nodes, and the propagating is performed:
deterministically based on the semantic relationships, and
probabilistically based on at least one of (ii) frequency information indicating a frequency with which a term of a node in the third set of nodes is known to occur when an associated item of a node in the first set of nodes also occurs and (ii) a predefined false positive or false negative rate;
after the propagating, calculating a marginal probability value for each node of the first set of nodes based on the states of the third set of nodes; and
outputting a search result ranking, ordered according to the calculated marginal probability values.

20. A hardware-implemented computer-readable storage medium having stored thereon a series of instructions executable by at least one processor of at least one computer, the instructions which, when executed, cause the at least one processor to perform a method, the method comprising:
performing the following using a search database that includes a first set of nodes corresponding to potential search results, a second set of nodes corresponding to entity-selectable search queries that are also terms of an ontology describing all of the potential search results, wherein each term is an attribute of a corresponding potential search result, and a third set of nodes corresponding to non-selectable terms that represent hidden states of the second set of nodes, wherein the nodes of the search database are connected in accordance with semantic relationships specified by the ontology and activated in response to search queries:

obtaining, from an entity, a search query matching one of the entity-selectable search queries;

changing, in response to obtaining the query, a state of the node corresponding to the matching search query to an activated state;

propagating the change in state of the node to at least one other node in the network, wherein the at least one other node includes a node in the third set of nodes, and the propagating is performed:

deterministically based on the semantic relationships, and probabilistically based on at least one of (ii) frequency information indicating a frequency with which a term of a node in the third set of nodes is known to occur when an associated item of a node in the first set of nodes also occurs and (ii) a predefined false positive or false negative rate;

after the propagating, calculating a marginal probability value for each node of the first set of nodes based on the states of the third set of nodes; and outputting a search result ranking, ordered according to the calculated marginal probability values.

21. A method for constructing a search database using an ontology, the method comprising:

via at least one processor:

obtaining a list of items, each item corresponding to a potential search result;

obtaining a list of terms from an ontology that describes the items;

dividing the terms into user-selectable search queries and non-selectable terms; and adding the items and the terms as nodes in a network, wherein the nodes are connected based on semantic relationships specified by the ontology;

wherein:

the network has three layers, a first layer including a node for each of the items, a second layer including a node for each search query, and a third layer including a node for each non-selectable term;

the second layer nodes correspond to user-observed states of their respective terms; and the third layer nodes correspond to hidden states of the terms represented in the second layer; and the method further comprising:

activating two additional nodes to the network, wherein a first one of the additional nodes influences a local probability distribution of the nodes in the third layer in accordance with the false positive rate and a second one of the additional nodes influences the local probability distribution of the nodes in the third layer in accordance with the false negative rate;

activating intra-layer connections to the second and the third layers to control propagation of annotations throughout the network, including annotations to the two additional nodes; and configuring the network such that a probability of nodes in the first layer is determined by updating states of nodes in the third layer:

deterministically based on the semantic relationships, and probabilistically based on at least one of (ii) frequency information indicating a frequency with which a term of a node in the third layer is known to occur when an associated item of a node in the first layer also occurs and (ii) a predefined false positive or false negative rate.

* * * * *